(12) United States Patent
Smith

(10) Patent No.: US 10,167,030 B1
(45) Date of Patent: Jan. 1, 2019

(54) MOUNTABLE MAGNETIC RETRACTABLE TETHERED PUCK FOR TWO WHEELED VEHICLES

(71) Applicant: 4 Sure Kick, LLC, Cocoa, FL (US)

(72) Inventor: Cindy Smith, Cocoa, FL (US)

(73) Assignee: Cindy Smith, Cocoa, FL (US)

( * ) Notice: Subject to any disclaimer, the term of this patent is extended or adjusted under 35 U.S.C. 154(b) by 96 days.

(21) Appl. No.: 15/475,777

(22) Filed: Mar. 31, 2017

Related U.S. Application Data

(60) Provisional application No. 62/324,955, filed on Apr. 20, 2016.

(51) Int. Cl.
*B62H 1/02* (2006.01)
*B62H 1/08* (2006.01)
*B62J 1/00* (2006.01)

(52) U.S. Cl.
CPC ............... *B62H 1/02* (2013.01); *B62H 1/08* (2013.01); *B62J 1/00* (2013.01)

(58) Field of Classification Search
CPC ............... B62H 1/02; B62J 1/08; B62J 1/00
See application file for complete search history.

(56) References Cited

U.S. PATENT DOCUMENTS

| | | | |
|---|---|---|---|
| 3,712,640 A | 1/1973 | Shipman et al. | |
| 3,955,829 A | 5/1976 | Bussler | |
| 3,970,330 A | 7/1976 | Norcross | |
| 4,474,387 A | 10/1984 | Maranell et al. | |
| 4,521,031 A | 6/1985 | Huth | |
| 4,625,987 A * | 12/1986 | Marsh | B62H 1/02 280/293 |
| 4,768,800 A | 9/1988 | Johns | |

(Continued)

FOREIGN PATENT DOCUMENTS

| | | |
|---|---|---|
| CA | 2757441 | 5/2013 |
| GB | 2440323 | 1/2008 |

OTHER PUBLICATIONS

Motorcycle Kickstand Plate Biker Kick Stand Made in USA Universal, 2017, retrieved from http://www.ebay.com/itm/MOTORCYCLE-KICKSTAND-PLATE-BIKER-KICK-STAND . . . retrieved on Mar. 16, 2017, 4 pages.

(Continued)

*Primary Examiner* — Anne Marie M Boehler
*Assistant Examiner* — Marlon A Arce

(57) ABSTRACT

Devices, apparatus, systems and methods for using a magnet retractable support platform for kickstands for use with two wheeled vehicles that include motorcycles, mopeds and bicycles. While a two wheeled vehicle is parked, a kickstand support, such as a puck, can be magnetically attached to a lowered kickstand on a two wheeled vehicle by a magnet in the kickstand support. A tether line can have an end attached to the kickstand support and an opposite end tethered to a mounted retriever assembly that can be clamped to handlebars of the two-wheeled vehicle. A spring in the retriever assembly can activated by a switch to retract the tether line and allow for the kickstand support to be attached again to the mounted retriever assembly when the kickstand support is not being used. A clip and/or a second magnet on the retriever assembly can also releasably attach the kickstand support to the retriever assembly when the kickstand support is not being used.

20 Claims, 12 Drawing Sheets

(56) References Cited

U.S. PATENT DOCUMENTS

| | | | |
|---|---|---|---|
| 4,819,957 A * | 4/1989 | Printy | B62H 1/02 248/188.9 |
| 4,846,491 A | 7/1989 | Caceres | |
| D306,419 S | 3/1990 | Merritt | |
| 4,971,347 A | 11/1990 | Cline | |
| 5,257,803 A | 11/1993 | Fisher | |
| 5,351,981 A | 10/1994 | Thomas | |
| 5,367,784 A | 11/1994 | Krebs | |
| D353,070 S | 12/1994 | Hilton, Sr. et al. | |
| 5,484,153 A | 1/1996 | Ricciardi | |
| 5,501,479 A | 3/1996 | Fehrenbach et al. | |
| 5,503,420 A | 4/1996 | Consiglio et al. | |
| D378,205 S | 2/1997 | Hiltz, Jr. | |
| D396,435 S * | 7/1998 | Favereaux, Sr. | D12/120 |
| 6,196,567 B1 * | 3/2001 | Lynam | B62H 1/02 280/288.4 |
| 6,340,166 B1 | 1/2002 | Rethman et al. | |
| 6,669,221 B2 | 12/2003 | Leppke et al. | |
| 6,699,161 B1 | 3/2004 | Speas | |
| D507,994 S | 8/2005 | Bacon | |
| 7,028,808 B2 | 4/2006 | Zeaman | |
| D530,649 S | 10/2006 | Hoskins | |
| 7,267,353 B1 * | 9/2007 | Mayhew | B62H 1/02 248/188.9 |
| D563,837 S | 3/2008 | Irwin et al. | |
| D585,227 S | 1/2009 | Kaczmarczyk, Jr. | |
| 7,621,550 B1 | 11/2009 | Boruff et al. | |
| 7,648,152 B1 | 1/2010 | Litter | |
| 7,717,449 B2 | 5/2010 | Ballard | |
| 8,590,170 B2 | 11/2013 | Wagner | |
| 8,714,464 B2 * | 5/2014 | Carrozza | B62J 99/00 239/333 |
| 8,978,594 B2 | 3/2015 | Daniels et al. | |
| D737,732 S | 9/2015 | Stockett | |
| 9,155,287 B2 | 10/2015 | Messner | |
| 9,211,926 B1 | 12/2015 | Blaeser | |
| 9,339,014 B1 | 5/2016 | Wettermann et al. | |
| 2002/0014766 A1 | 2/2002 | Leppke et al. | |
| 2002/0163160 A1 | 11/2002 | Golemba | |
| 2004/0262880 A1 | 12/2004 | McClure | |
| 2017/0297640 A1 * | 10/2017 | Wiinamaki | B62H 1/02 |

OTHER PUBLICATIONS

Maier Black Carbon Fiber Kickstand Pucks—99012-30BX6, 2017, retrieved from http://www.denniskirk.com/maier/black-carbon-fiber-kickstand-pucks-99012-30bx6.p5000596.prd/5000596.sku, retrieved on Mar. 16, 2017, 4 pages.

Speedmetal Kickstand Pad, 2016, retrieved from https://www.cyclegear.com/parts/speedmetal-kickstand-pad, retrieved on Mar. 16, 2017, 3 pages.

Paddock Mate, 2012, retrieved from http://oxford-products.com/us/products/Paddock-Mate.html, retrieved on Mar. 16, 2017, 1 page.

SW-MOTECH Large Side Stand Foot, 2017, retrieved from https://www.rockymountainatvmc.com/p/1490/41254590/SW-MOTECH-Large-Side-Stand-Foot?v=14434&gclid=CPTx6K_L291CFVY8gQod4i4JMQ, retrieved on Mar. 16, 2017, 2 pages.

Motorcycle kickstand Pads, Elite Round, 2016, retrieved from https://www.printglobe.com/motorcycle-kickstand-pads-elite-round/28864, retrieved Mar. 16, 2017, 8 pages.

Safetkick Motorcycle Kickstand Pad Support, 2010, retrieved from http://www.safetkick.com/, retrieved on Mar. 16, 2017, 2 pages.

MG Kickstand Plate, 2016, retrieved from http://motorcycle-gadgets.com/viewitem.php?productid=9, retrieved on Mar. 16, 2017, 1 page.

Cycle Saver Pad, 2013, retrieved from http://www.cyclesaverpad.com/, retrieved on Mar. 16, 2017, 1 page.

Side Stand Base Extension, BMW F800R/ST/GT, 2017, retrieved from https://touratech-usa.com/Store/Side-stand-base-extension-BMW-F800R-ST-GT, retrieved on Mar. 16, 2017, 2 pages.

Larger Sidestand Foot, Streetline, BMW R1200/RT up to 2013, 2017, retrieved from https://touratech-usa.com/Store/Larger-Sidestand-Foot-Streetline-BMW-R1200-RT-up-to-2013, retrieved on Mar. 16, 2017, 2 pages.

Yamaha FJR 1300 Sidestand Feet, 2017, retrieved from https://touratech-usa.com/Yamaha-F JR-1300-Sidestand-Feet, retrieved on Mar. 16, 2017, 2 pages.

Large Sidestand Foot, BMW F700GS, 2017, retrieved from https://touratech-usa.com/Store/Large-Sidestand-Foot-BMW-F700GS, retrieved on Mar. 16, 2017, 3 pages.

Sidestand Larger Foot, BMW K1200GT / K1300GT, 2017, retrieved from https://touratech-usa.com/Store/Sidestand-Larger-Foot-BMW-K1200GT-K1300GT, retrieved on Mar. 16, 2017, 2 pages.

* cited by examiner

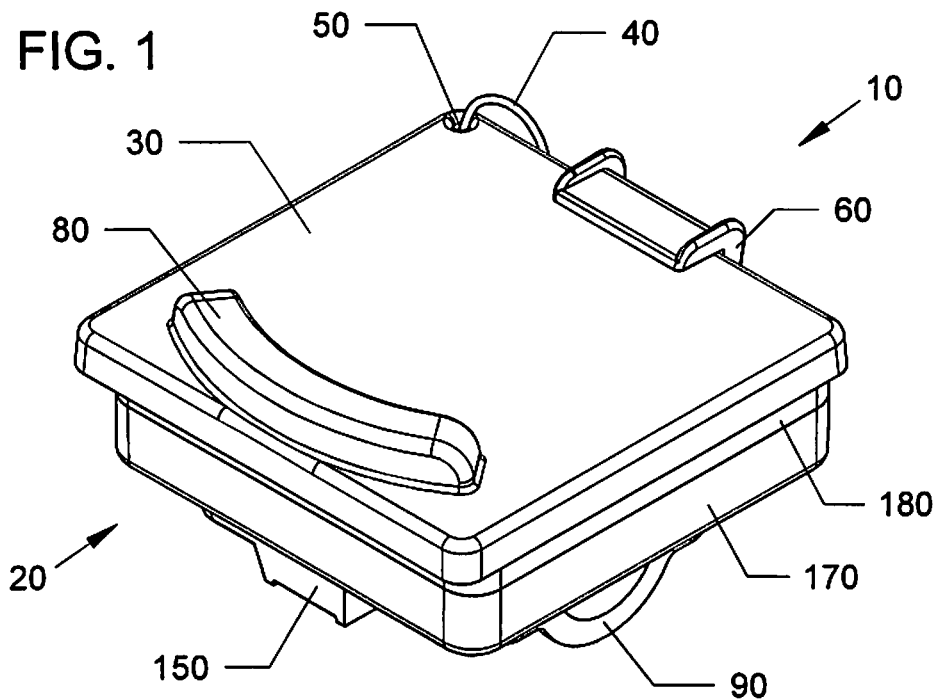
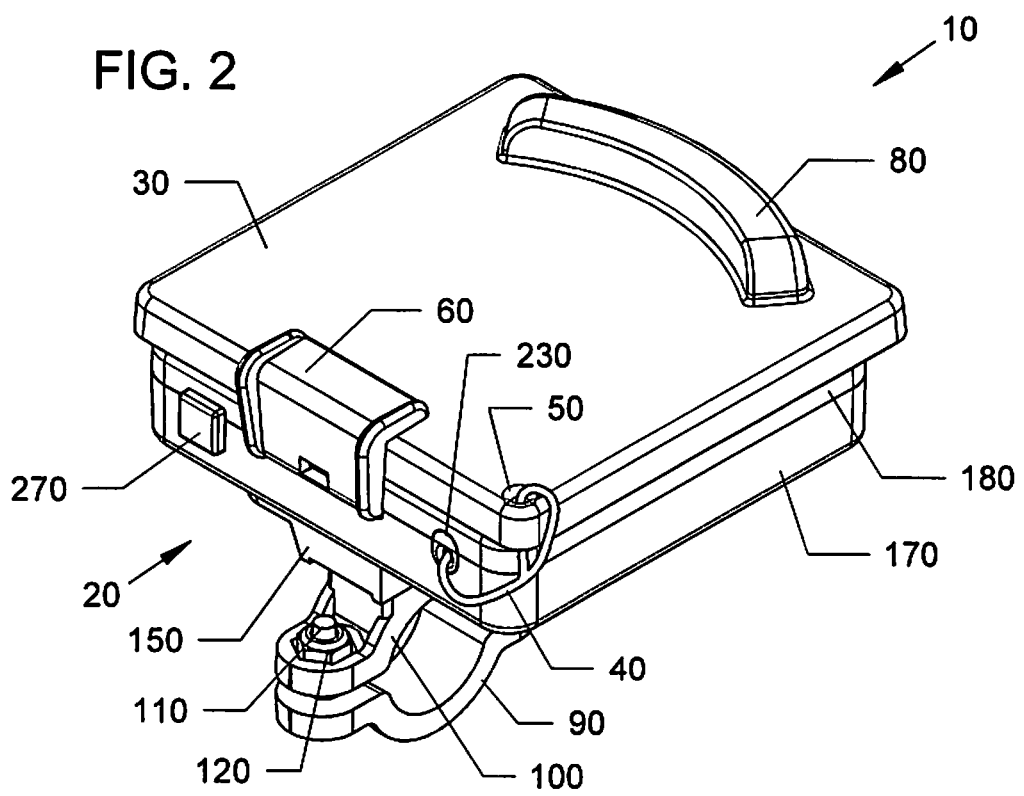

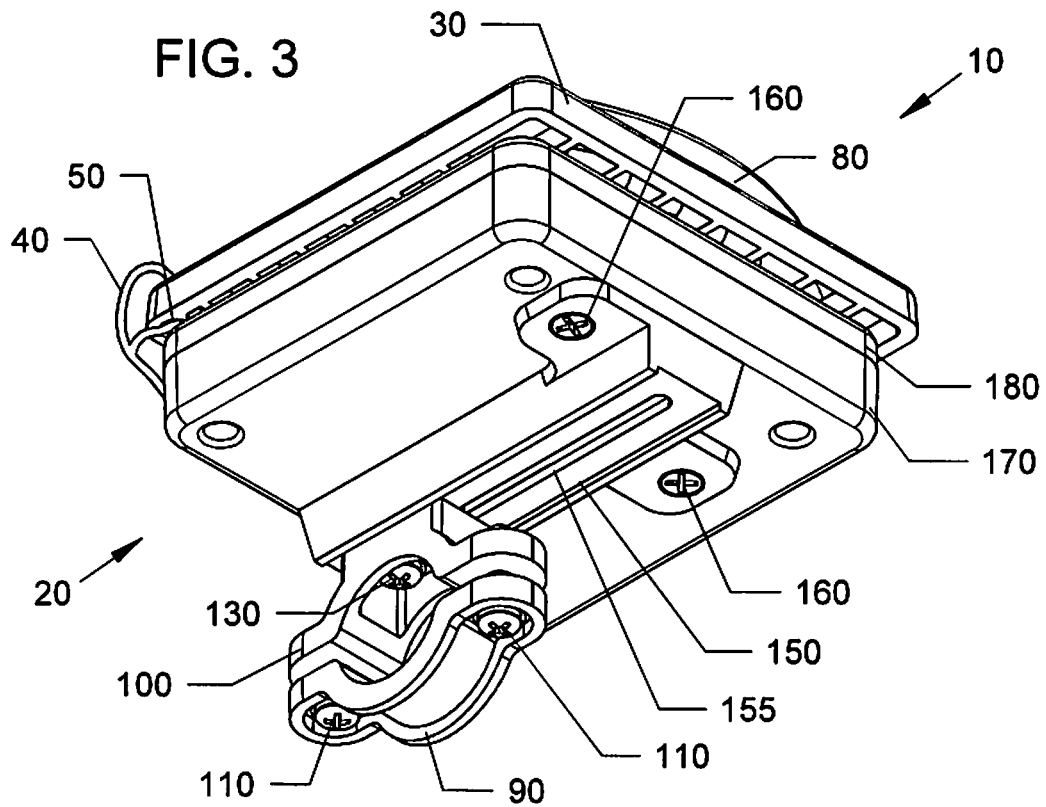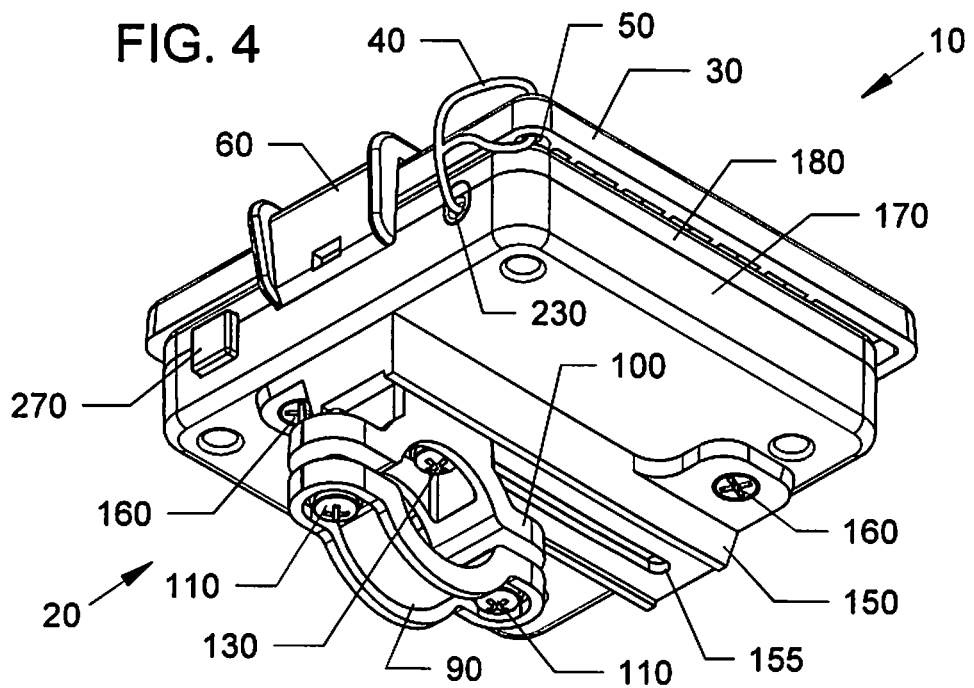

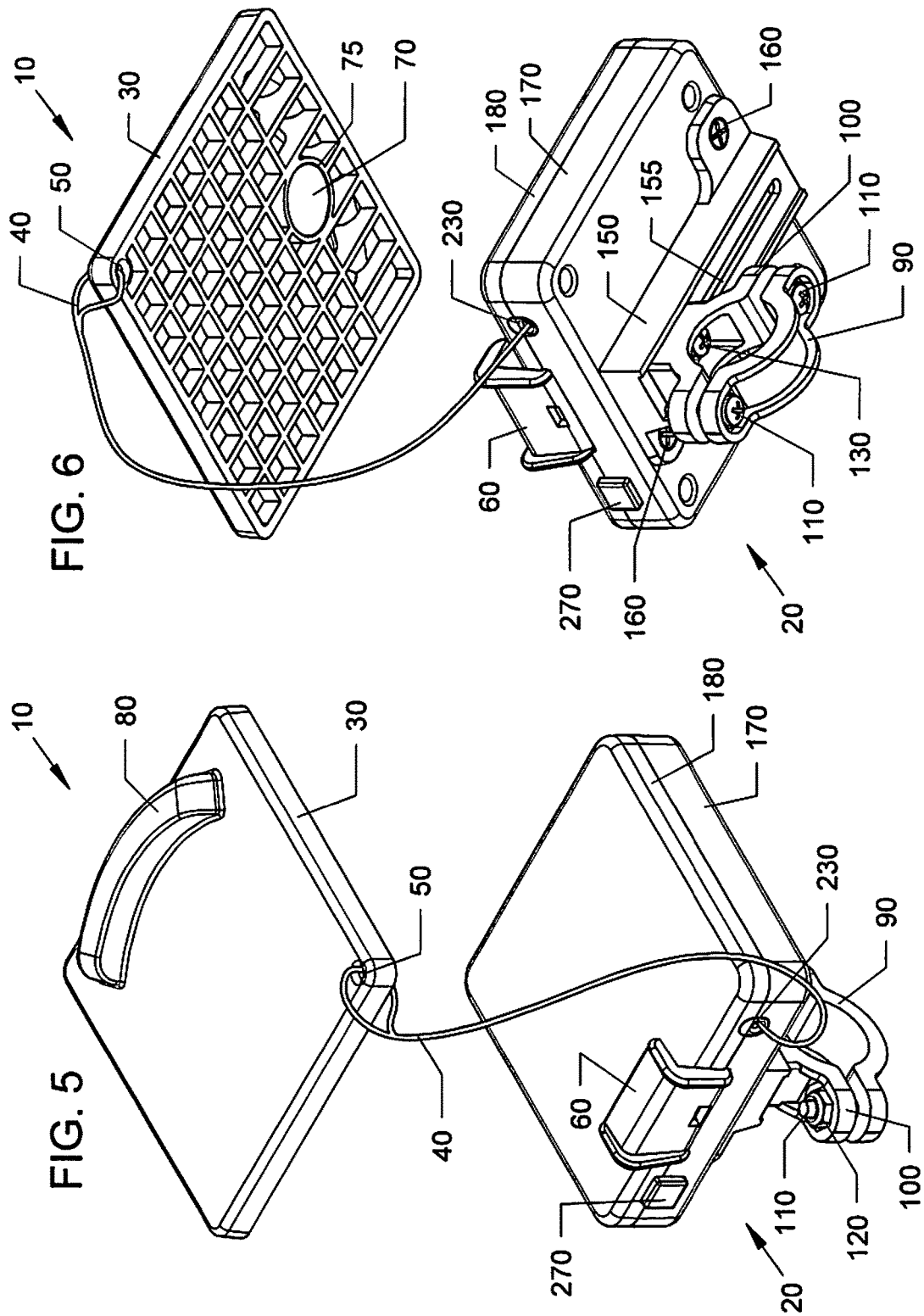

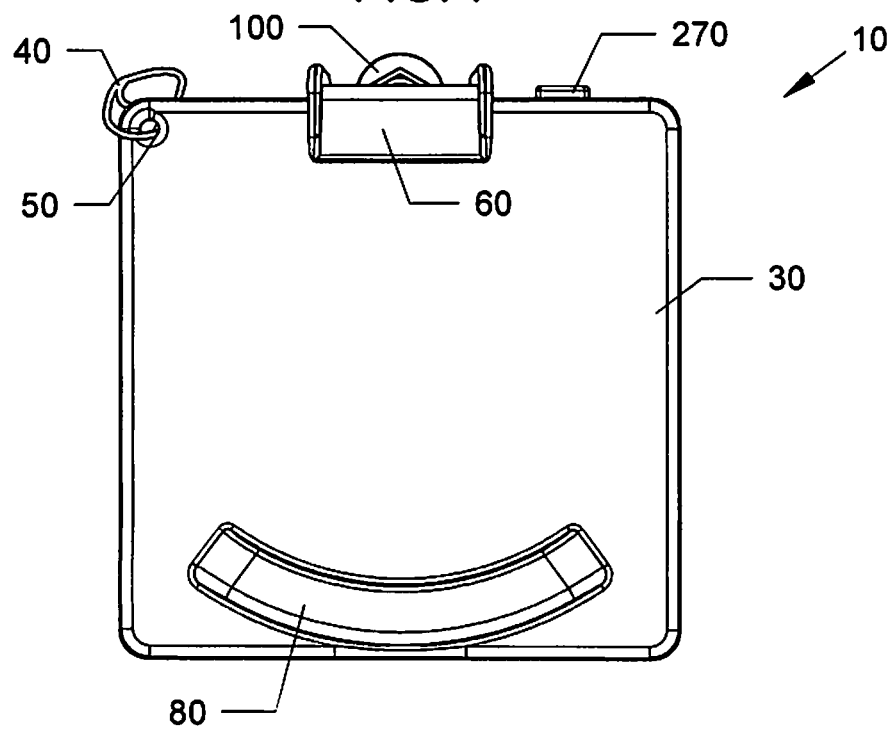
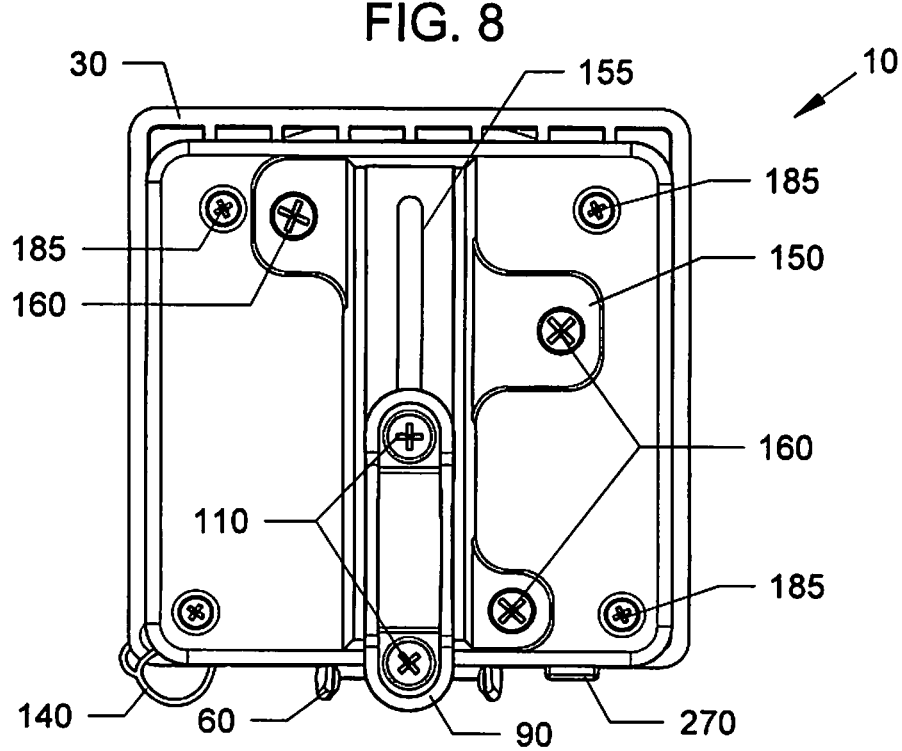

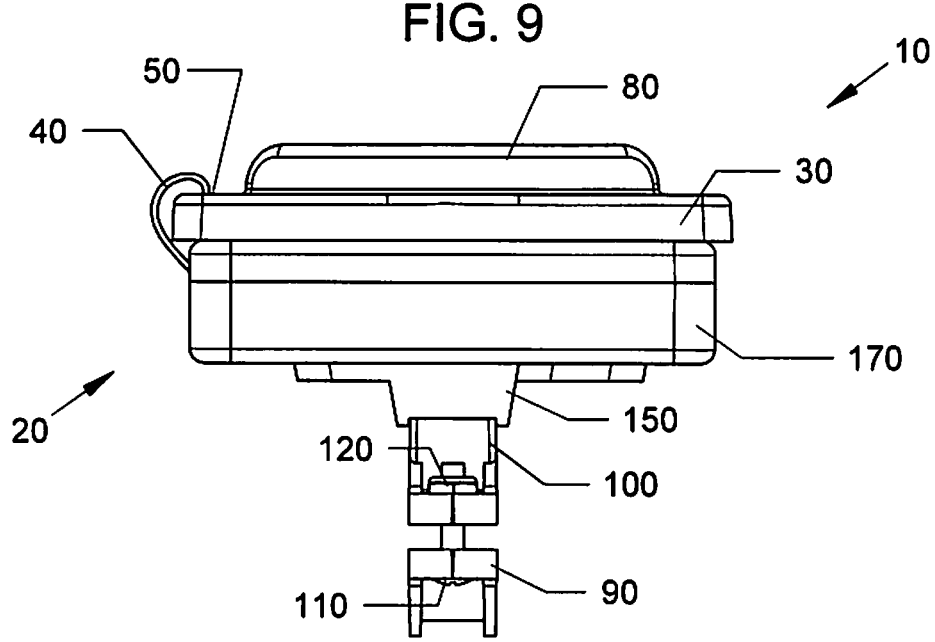
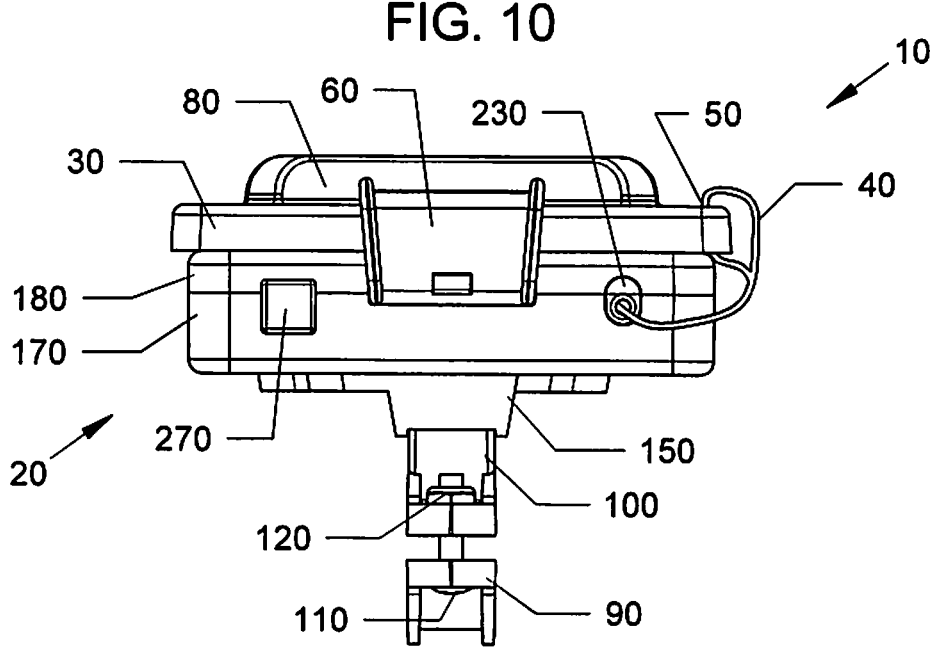

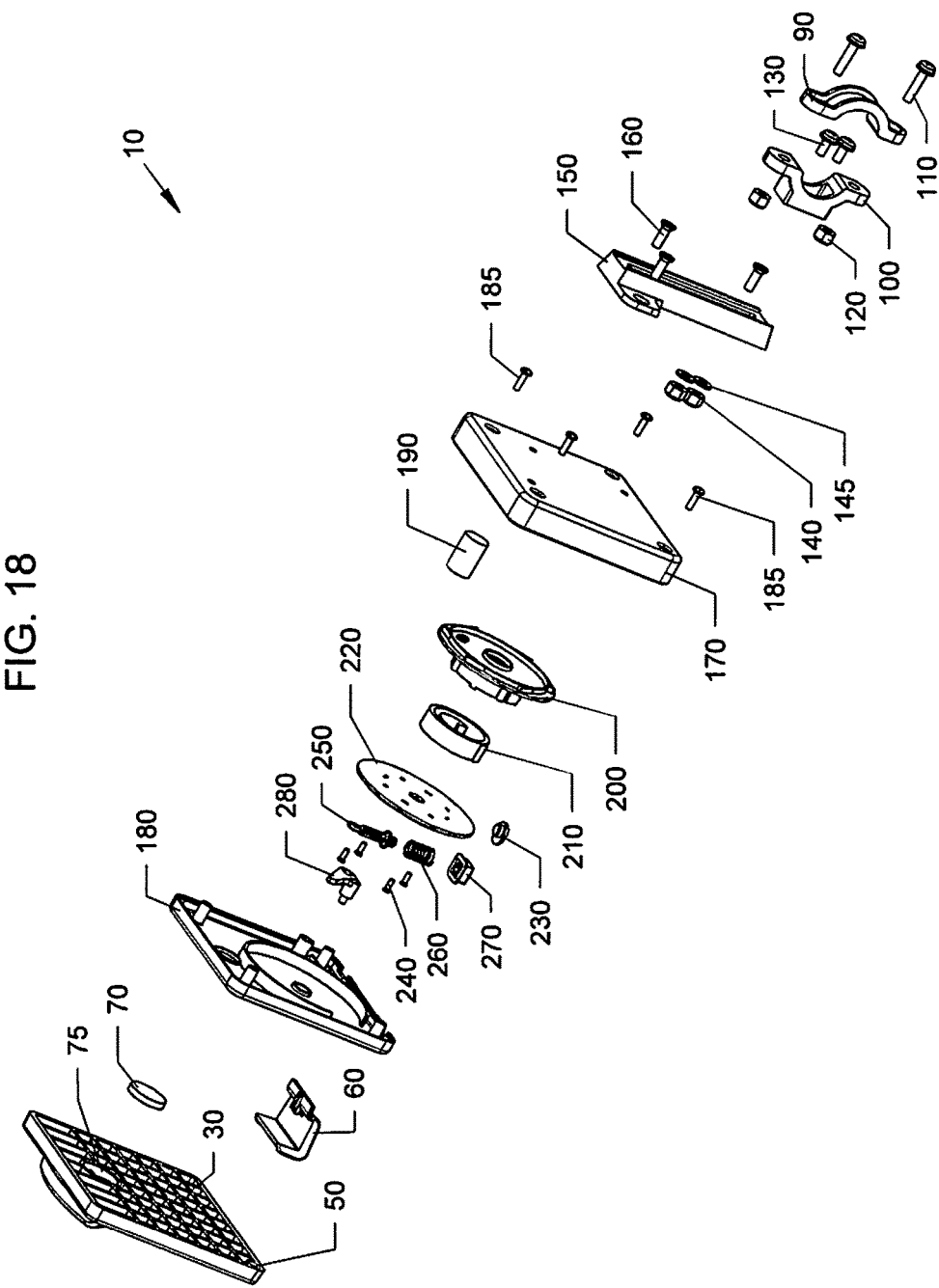

MOUNTABLE MAGNETIC RETRACTABLE TETHERED PUCK FOR TWO WHEELED VEHICLES

CROSS REFERENCE TO RELATED APPLICATIONS

This application claims the benefit of priority to U.S. Provisional Application Ser. No. 62/324,955 filed Apr. 20, 2016, which is incorporated by reference in its' entirety.

FIELD OF INVENTION

This invention relates to kickstands, and in particular to devices, apparatus, systems and methods for using a magnetic retractable support platform for kickstands for use with two wheeled vehicles that include motorcycles, mopeds and bicycles, wherein the kickstand support is magnetically attracted to a kickstand by a magnet with an opposite end tethered to handlebars of the two-wheeled vehicle, with a spring to retract the kickstand support when it is not being used.

BACKGROUND AND PRIOR ART

Two wheeled vehicles, such as motorcycles and bicycles have been increasing in popular over the years as desirable forms of transportation, and often use pivoting kickstands which can be lowered to support the two-wheeled vehicle when the vehicle is parked. A problem with the kickstands are that they are generally designed to require the lowered kickstand must be supported on a solid surface such as asphalt or concrete in order to fully support the weight of the two-wheeled vehicle in a parked position. This design purpose for the kickstands creates problems for the riders.

Motorcycle and bicycle riders are not always able to stop and dismount their two wheeled vehicles on concrete and asphalt surfaces. For example, weekend motorcyclists will often stop their bikes on grassy areas or in areas where the ground surface can be soft. Lowering the kick stand on grass, and/or sandy areas and/or muddy areas and/or soft areas can result in the kickstands sinking into the parking ground surface, and possibly causing the bikes to tip over. The tipping over of the two wheeled vehicles, especially expensive motorcycles, can cause considerable damage to the bikes. Additionally, the rider can be injured by the bike falling over.

Additionally, requiring the rider to always find a sold surface to park their bikes limits the fun and enjoyment of using two wheeled bikes in many applications such as riding the bikes on unpaved or non-solid ground surfaces, and the like.

Various solutions have been proposed over the years, such as using removable large pads. See for example, U.S. Patent Application Publications: 2004/0262880 to McClure; 2002/0163160 to Golemba; and U.S. Pat. No. 9,211,926 to Blaeser; U.S. Pat. No. 7,717,449 to Ballard; D585,227 to Kaczmarcyk, Jr. D563,837 to Irwin et al. However, these pads have inherent problems.

For example, the pads must be physically positioned and oriented underneath the kickstand, which can be difficult while sitting on the bike. Additionally, the pads are difficult to retrieve when the rider gets back on the bike, and has to tilt the bike up while bending over to retrieve the pads. Additionally, these pads are not easily accessible on the bike, since the rider may not have room in their pockets, and/or have difficulty reaching storage bags and the like, when they are sitting on the bike.

Tether line pads have also been proposed. See for example, U.S. Pat. No. 7,267,353 to Mayhew and Des. 396,435 to Favereaux, Sr. However, similar to the other pad versions referenced above, these types of pads must also be physically positioned and oriented underneath the kickstand, which can be difficult while sitting on the bike.

Thus, the need exists for solutions to the above problems with the prior art.

SUMMARY OF THE INVENTION

A primary objective of the present invention is to provide easily accessible devices, apparatus, systems and methods for using a magnetic retractable support platform for kickstands for use with two wheeled vehicles that include motorcycles, mopeds and bicycles, wherein the kickstand support is magnetically attracted to a kickstand by a magnet with an opposite end tethered to handlebars of the two-wheeled vehicle, with a spring to retract the kickstand support when it is not being used.

An embodiment of the novel assembly can include a rectangular puck having a magnet where the puck is removably attached to a mount on a two wheeled vehicle by a clip. Additionally, a separate magnet in the mount can be used with or without the clip to further secure the puck to the mount for a secured position. A spring biased reel inside the mount can include a tether line can have a retracted position when the puck is attached to the mount and an extended position(s) when the puck is pulled away from the mount.

When the two wheeled vehicle is parked, the user can separate the puck by moving it out from the clip and/or by rotating the puck out from the mount interrupting the magnetic connection between the two magnets. Next, the puck with the tether line can be extended to a desired distance where the puck can be placed under the lowered kickstand of the two wheeled vehicle to provide a base support underneath the lowered kickstand while the two wheeled vehicle is parked on a soft surface. In this position, the magnet in the puck can magnetically be attracted to the bottom of the lowered metal kickstand on the two wheeled vehicle.

When the two wheeled vehicle is ready to ride, the user can then return the puck to the secured position by raising the kickstand, followed by activating a switch on the mount which allows a release mechanism which enables an integrated spring to recoil to its' coiled position within a housing in the mount. At the same time the switch is activated, an internal stop inside the housing in the mount is disengaged allowing a spring coil to retract the tether line into the housing in the mount which allows the puck to be returned to the secured position with the mount.

The devices, apparatus, systems and methods can also include mounting the mount at a desired location along a set of handlebars by an adjustable clamp.

The devices, apparatus, systems and methods can also include a raised curved ridge on the puck which allows an edge of the lowered kickstand to abut against when the lowered kickstand in sitting onto top of the puck.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top rear perspective view of a kickstand support assembly with puck mounted on top of a retriever assembly.

FIG. 2 is a top front perspective view of the kickstand support assembly of FIG. 1.

FIG. 3 is a bottom rear perspective of the kickstand support assembly of FIG. 1.

FIG. 4 is a bottom front perspective view of the kickstand support assembly of FIG. 1.

FIG. 5 is a top front perspective of the kickstand support assembly of FIG. 1 with puck removed.

FIG. 6 is a bottom front perspective view of FIG. 5.

FIG. 7 is a top view of the kickstand support assembly of FIG. 1.

FIG. 8 is a bottom view of the kickstand support assembly of FIG. 1.

FIG. 9 is a rear view of the kickstand support assembly of FIG. 1.

FIG. 10 is a front view of the kickstand support assembly of FIG. 1.

FIG. 18 is a bottom perspective exploded view of the kickstand support assembly of FIG. 17.

DESCRIPTION OF THE PREFERRED EMBODIMENTS

Figure 11:
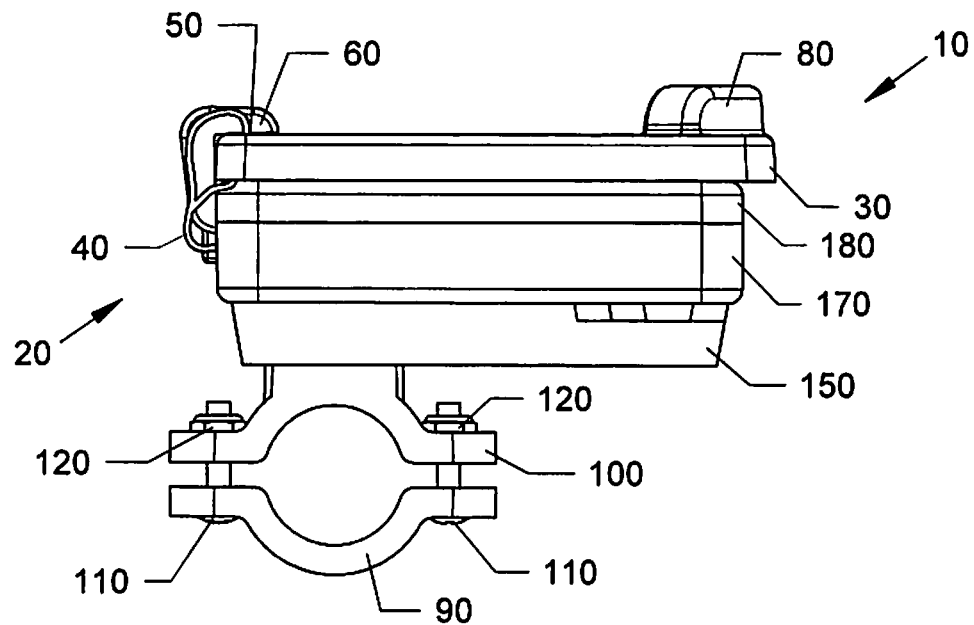
FIG. 11 is a right side view of the kickstand support assembly of FIG. 1.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 Kickstand support system assembly.
20 Retriever assembly.
30 Kickstand support puck.
40 Puck retrieval cord.
50 Puck cord attachment hole.
60 Puck storage clip.
70 Puck magnet.
75 Puck magnet cavity in puck.
80 Puck kickstand foot block.
90 Top handlebar clamp.
100 Bottom sliding handlebar clamp.
110 Handlebar clamp screw.
120 Handlebar clamp nut.
130 Bottom clamp mount screws.
140 Bottom clamp mount nuts.
145 locking washers
150 Sliding clamp mounting bracket.
155 Sliding clamp adjustment slot.
160 Sliding clamp mount bracket mounting screws.
170 Retriever body.
180 Retriever cover.
190 Retriever magnet, and to hold puck to base, and as used as optional mount.
200 Retrieval cord reel.
210 Coil spring.
220 Cord reel cover.
230 Cord guide.
240 Cord reel cover screws.
250 Cord lock release shaft.
260 Cord lock release spring.
270 Cord lock release button.
280 Reel stop pawl.
290 Motorcycle handlebar.
300 Motorcycle.
310 Motorcycle kickstand.
320 Ground or asphalt.

A present embodiment relates to a magnetic retractable kickstand base support apparatus, device, system and methods which enables a rider to releasably secure the apparatus to a set of handle bars and upon reaching a destination remove the kickstand base plate from the releasably affixed mounting plate by pulling on the attached tether the desired distance.

The present embodiments address the need for an embodiment that allows riders to park their vehicles on a soft surface while preventing the vehicle from tipping over. One example of an application is for motorcycle riders who frequently pull over on the side of the road where there is little or no asphalt or concrete to support their kickstand.

The apparatus, device, system and methods enables the rider to detach the kickstand base plate from the mounted plate, enabling the affixed tether to be extended the desired distance where it can be placed under the kickstand providing foundation stability. Upon completion, the tether can be recoiled back to its resting position into a retriever assembly within a housing located behind the base plate by depressing a release mechanism (cord release button).

FIG. 1 is a top rear perspective view of a kickstand support system assembly 10 which includes a retriever assembly 20 with a puck 30 mounted on top of a retriever body 170. FIG. 2 is a top front perspective view of the kickstand support assembly 10 of FIG. 1. FIG. 3 is a bottom rear perspective of the kickstand support assembly 10 of FIG. 1. FIG. 4 is a bottom front perspective view of the kickstand support assembly 10 of FIG. 1.

FIG. 5 is a top front perspective of the kickstand support assembly 10 of FIG. 1 with puck 30 removed from the retriever assembly 20. FIG. 6 is a bottom front perspective view of FIG. 5.

Figure 12:
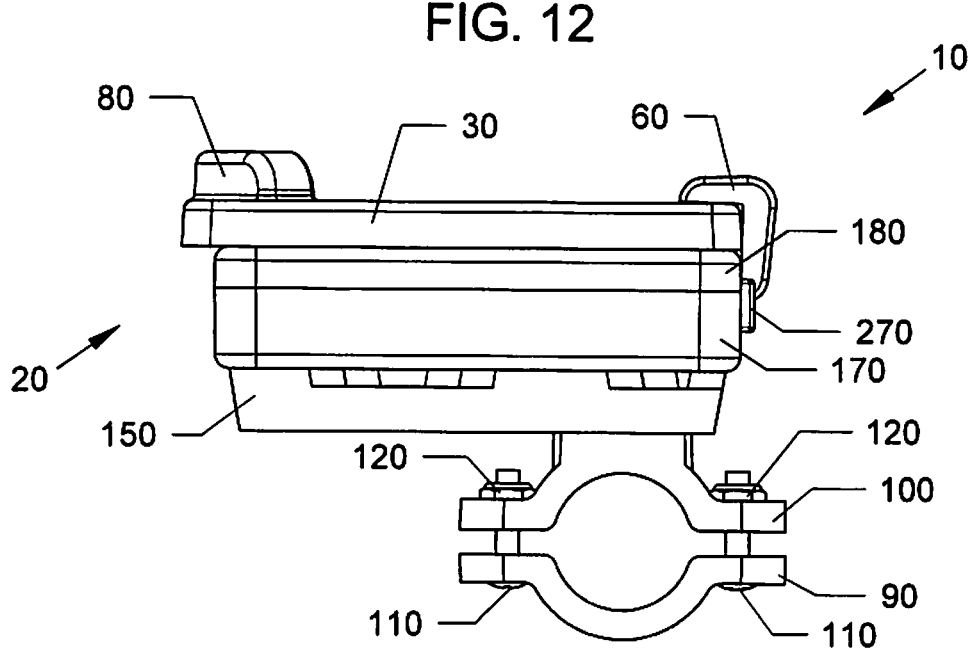
FIG. 12 is a left side view of the kickstand support assembly of FIG. 1.

FIG. 7 is a top view of the kickstand support assembly 10 of FIG. 1. FIG. 8 is a bottom view of the kickstand support assembly 10 of FIG. 1. FIG. 9 is a rear view of the kickstand support assembly 10 of FIG. 1. FIG. 10 is a front view of the kickstand support assembly 10 of FIG. 1. FIG. 11 is a right side view of the kickstand support assembly 10 of FIG. 1. FIG. 12 is a left side view of the kickstand support assembly 10 of FIG. 1.

Referring to FIGS. 1-12, the kickstand support system assembly 10 can include a retriever assembly 20 along with a removable puck 30 that can be attached to one another by a tether line, such as a retrieval cord 40.

The removable puck 30 can have a generally rectangular plate configuration with a generally flat top surface having a raised curved member 80 which can function as a foot block for the kickstand of a two-wheeled vehicle which will be later described. The bottom of the puck 30 can have a generally flat surface with a plurality of molded indentations, such as rectangular indentations which can provide an enhanced gripping surface with a ground surface on which the puck 30 rests. A cylindrical cavity 75 can house a magnet 70 inside of the puck 30. The magnet 70 can have a diameter of approximately ½ inch to approximately ¾ of an inch and larger up to approximately 1 & ½ inches in diameter, and up to approximately 1 inch in thickness.

One corner of the puck 30 can have an attachment hole 50 to attaching one end of the cord 40. The opposite end of the cord 40 can be attached to the retriever assembly 20.

Figure 17:
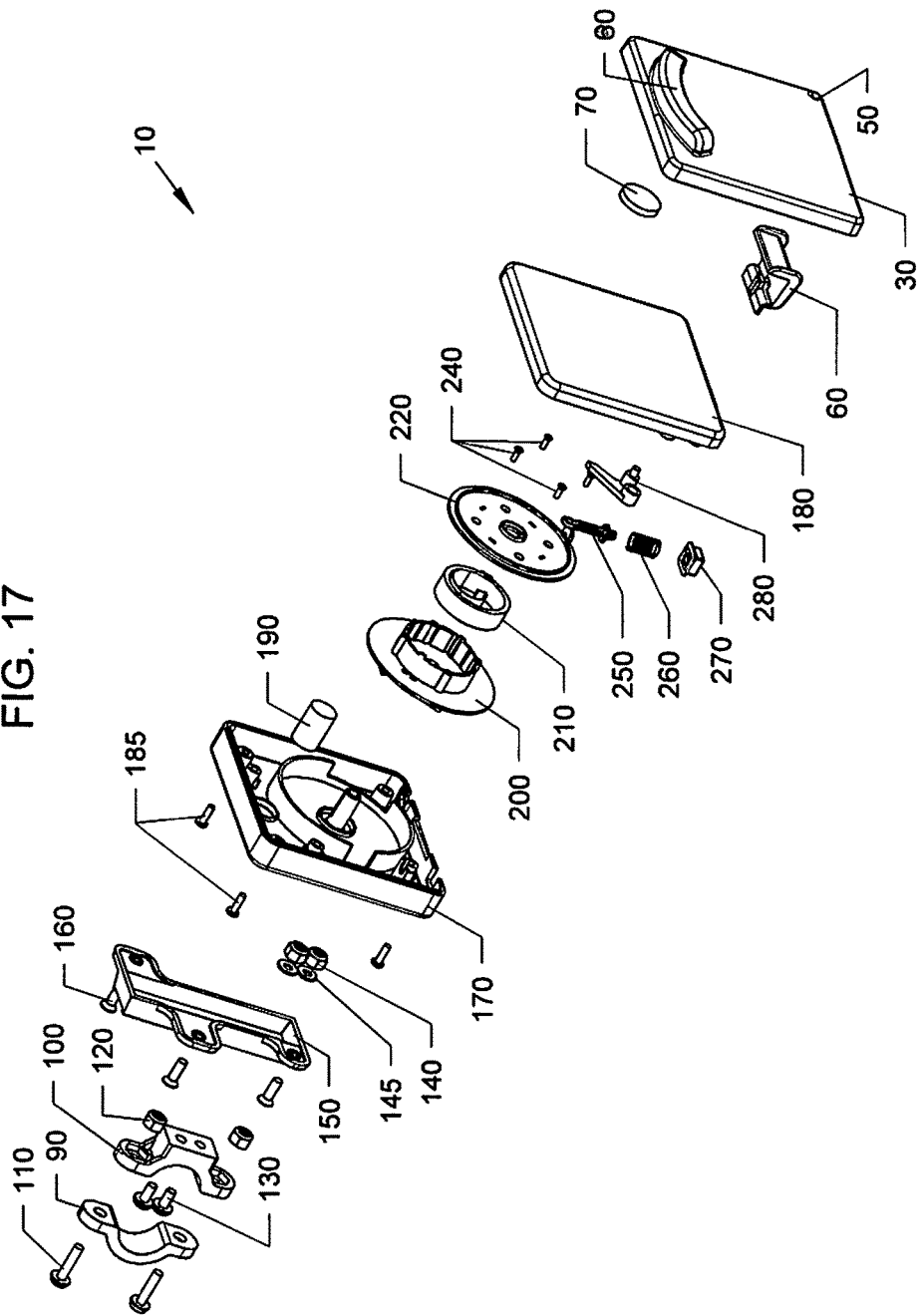
FIG. 17 is a top perspective exploded view of the kickstand support assembly of the preceding Figures.

FIG. 17 is a top perspective exploded view of the kickstand support assembly 10 of the preceding Figures. FIG. 18 is a bottom perspective exploded view of the kickstand support assembly 10 of FIG. 17.

Referring to FIGS. 1-12 and 17-18, the other end of the cord 40 can pass into a cord guide 230 in the side of the retriever assembly 20 to a spring assembly, which can include a coil spring 210 that is sandwiched between a cylindrical portion of a retrieval cord reel 200 and a cord reel cover 220. Fasteners 240 such as screws can attach the cover 220 to a base of the retriever body 170. A retriever cover 180 can hold in place a cord lock release shaft 250 with a cord lock release spring 260 and cord lock release button 270 and reel stop pawl 280. The spring 210 being under tension can cause the cord 40 to wrap about the cord reel 200.

After the puck is removed and pulled away from the retriever assembly by extending the cord 40 to a desired extension where the cord remains extended, and used under the lowered kickstand. The cord can later be retracted about the cord reel 200 by activating a switch 270 which can include a depressible button that when activated can cause the coil spring to recoil and rotate the reel 200 to cause the cord to move from its' desired extension to roll up and on the reel 200. These ratchet type components can function similar to other types of spring loaded retractable tether type lines which allow tether lines to remain at different extended positions and later retract by a spring onto an internal reel by activating a switch are shown and described in U.S. Pat. No. 9,339,014 to Wettermann et al., U.S. Pat. No. 9,155,287 to Messner; and U.S. Pat. No. 8,978,594 to Daniels et al., which are incorporated by reference in their entirety. Other types of spring loaded retractable tether type lines and tapes, can be used, such as but not limited to U.S. Pat. No. 5,367,784 to Krebs; U.S. Pat. No. 8,590,170 to Wagner and, which are incorporated by reference in their entirety.

The retriever assembly 20 can include a lower surface with a top U shaped clamp 90 and bottom U shaped clamp 100 which are held together by fasteners 110 such as screws, to form a clamp member. Bottom clamp mount fasteners 130, such as screws, can pass through holes in the bottom clamp 100 to connect with nuts 120, and slide within sliding slot 155 in sliding clamp mounting bracket 150. The installer can adjust the position of the top and bottom clamps 90, 100, in the slot 155 of the mounting bracket 150. Fasteners 160, such as screws, can attach the mounting bracket 150 to retriever body 170, and held in place by nuts 140 with locking washers 145, and the like.

The retriever assembly 20 can have a puck storage clip 60 pre-attached along one edge which can be used to clip about an edge of the puck 30, when the puck 30 is not being used. A retriever magnet 190 can be held in place in a mateable slot on the inside of retriever body 170, and can magnetically attach to the magnet 70 in the puck 30 and also be used to attach the puck 30 to the retriever assembly 20, when the puck 30 is not being used, or as an alternate mount without using clamps.

Figure 13:
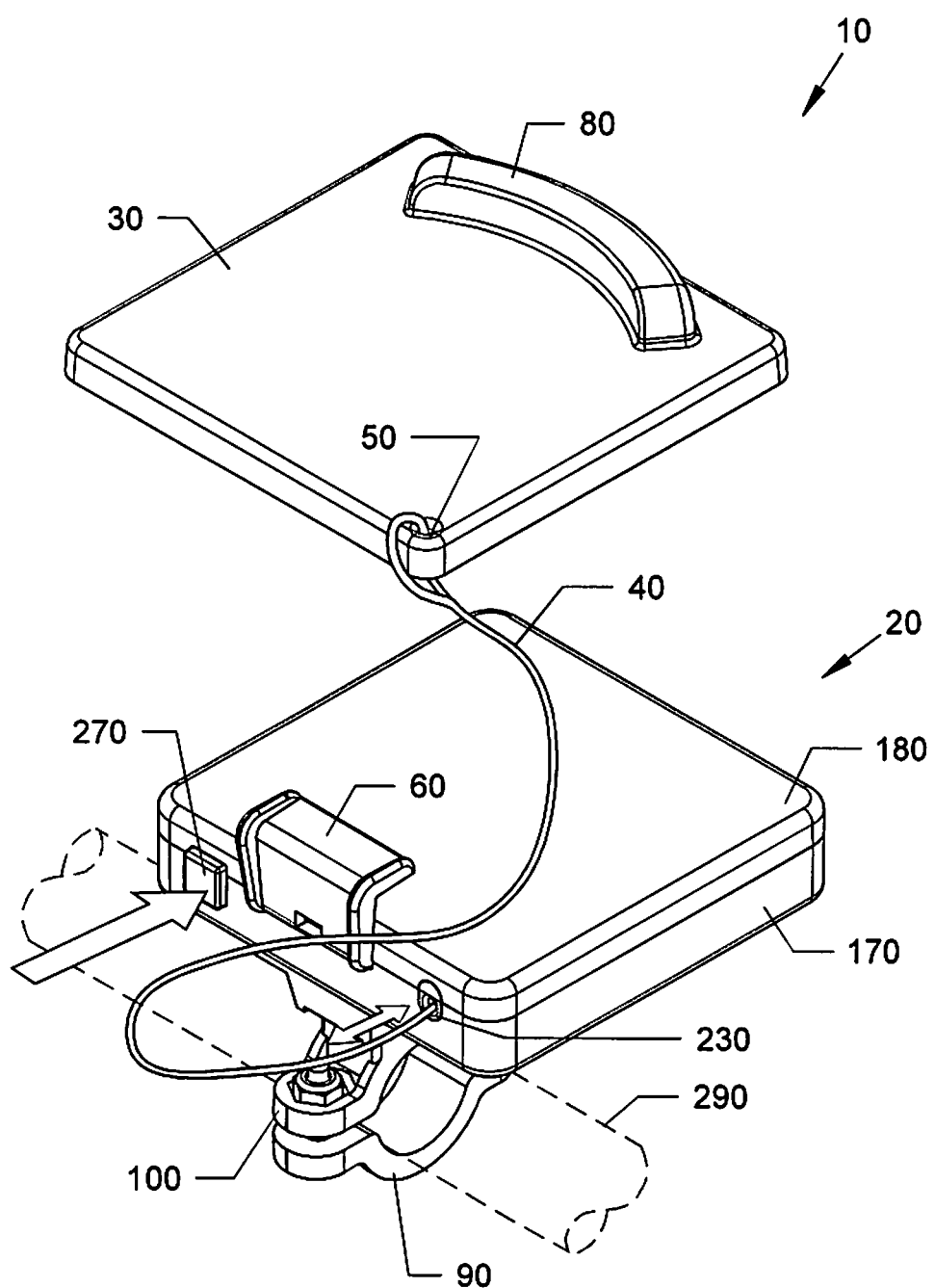
FIG. 13 is a top front perspective of the kickstand support assembly with puck removed of the preceding Figures mounted to motorcycle handlebar. Motion arrows indicate that when the cord lock release button is pushed the puck retrieval cord is coiled back into the retriever assembly.

FIG. 13 is a top front perspective of the kickstand support assembly 10 with puck 30 removed from the preceding Figures with the retriever assembly 20 mounted by the clamps 90, 100 to a motorcycle handlebar 290. Motion arrows indicate that when the cord lock release button 270 is pushed the puck retrieval cord 40 is coiled back into the retriever assembly 20 by the spring components previously shown and described in relation to FIGS. 17-18.

Figure 14:
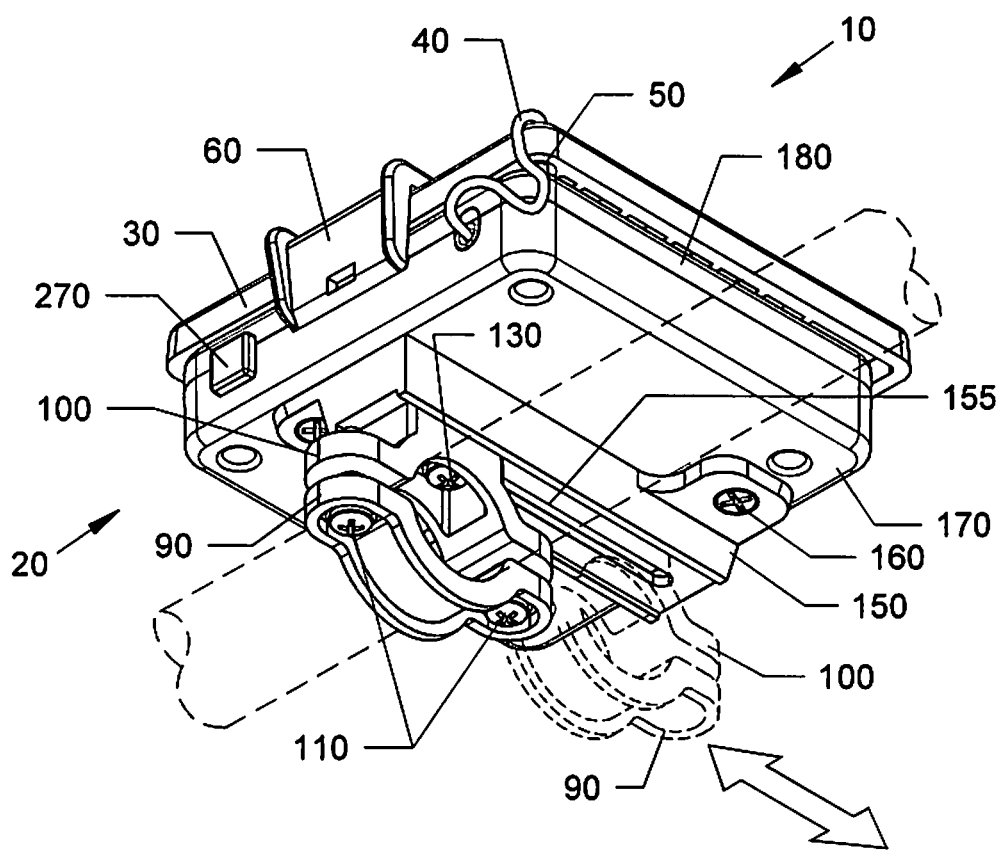
FIG. 14 is a bottom perspective view of FIG. 13 showing that the clamp is adjustable relative to the kickstand support assembly so that the retriever assembly can be positioned for best placement function if rider chooses to mount on bike.

FIG. 14 is a bottom perspective view of FIG. 13 showing that the clamps 90, 100 being adjustable relative to the kickstand support assembly 10 so that the retriever assembly 20 can be positioned for best function. Screws 110 can be loosened to allow for the retriever assembly 20 to be moved to desired position relative to handlebar 190, and clamps 90, 100 can slide within adjustment slot 155 in the mounting bracket 150 by loosening and tightening screw 130.

Figure 15:
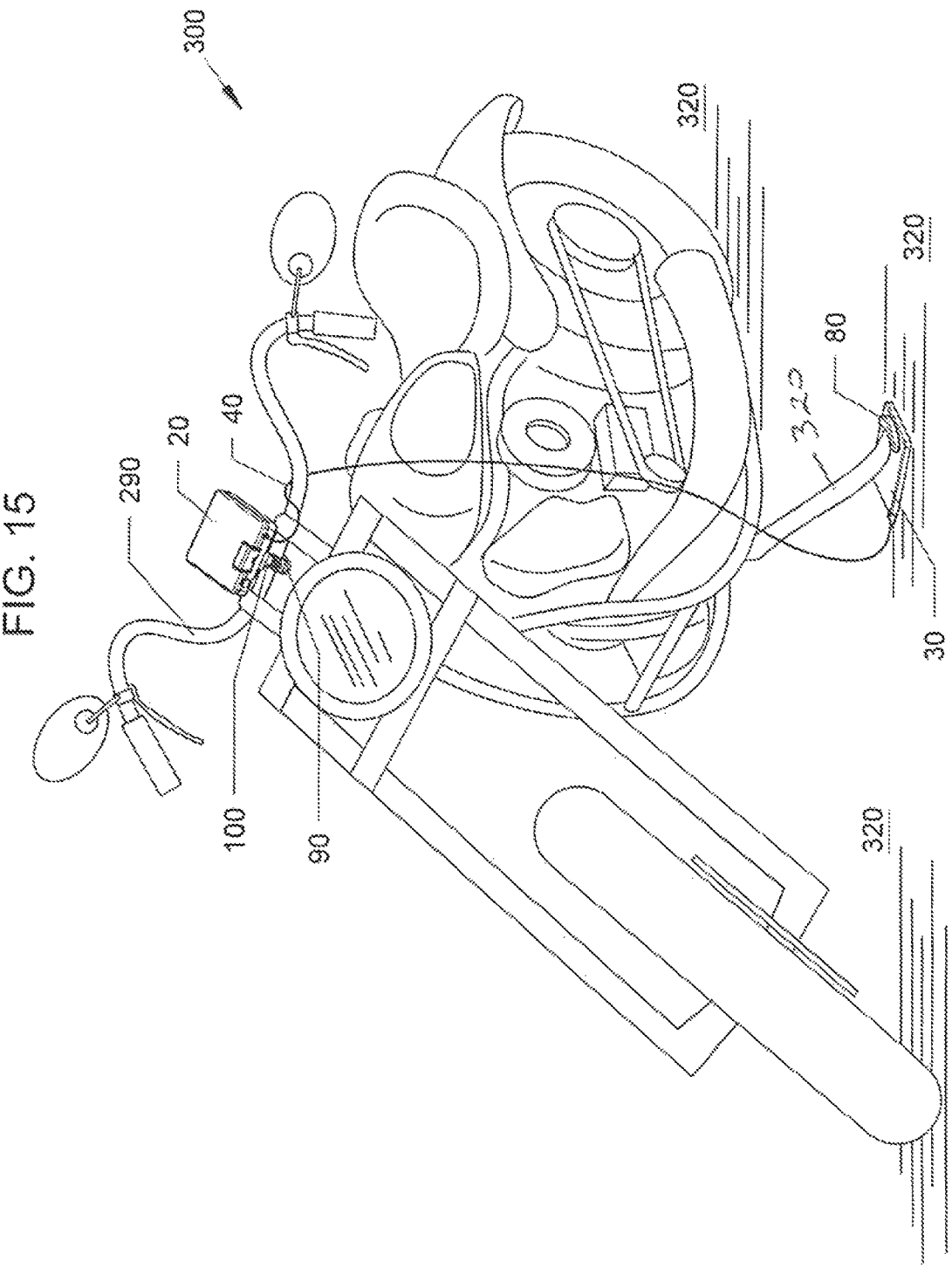
FIG. 15 is a front view of a motorcycle showing the kickstand support assembly of the preceding Figures with the retriever assembly mounted to the handlebar and the kickstand resting on the puck, which is tethered to the retriever.

FIG. 15 is a front view of a motorcycle showing the kickstand support assembly 10 of the preceding Figures with the retriever assembly 20 mounted to the handlebar 290 and the kickstand resting on the puck 30, which is tethered by line 40 to the retriever assembly 20.

Referring to FIGS. 1-15 and 17-18, the kickstand assembly 10 can be mounted to the handlebar 290 on the motorcycle 300, with the puck 30 attached to the retriever assembly 20 by the clip 60. When the motorcycle is parked, the user can remove the puck 30 from the clip 60 on the retriever assembly 20 so that the puck 30 can be pulled and the tether line cord 40 is extended to each pulled length. A ratchet type mechanism, which was previously described, in the receiver assembly 20, a retrieval cord reel 200, coil spring 210 with reel cover 180, and components 260, 280, and related components, allow for the tether line being pulled out of the retriever assembly 20 to stay at each pulled length position without retracting under coil spring 210. Pushing button 270 which is initially biased outward by spring 260, engages cord lock release shaft 250, and reel stop pawl 280 allowing for reel 200 to rotate by coil 210 causing the tether line cord 40 to retract about the hub on the reel 200 to wind and pull the tether cord 40 back into the retriever assembly 20. As previously described, these components can function similar to other types of spring loaded retractable tether type lines, such as those shown and described in U.S. Pat. No. 9,339,014 to Wettermann et al., U.S. Pat. No. 9,155,287 to Messner; and U.S. Pat. No. 8,978,594 to Daniels et al., which are incorporated by reference in their entirety.

When the puck 30 is pulled out, the puck 30 can be placed on the ground 320 with the curved raised edge 80 facing upward.

Next, the motorcycle driver can lower the kickstand 320 on the motorcycle 300 over the puck 30, with an outer lower edge of the kickstand 320 to abut against a concave curved raised edge of the curved foot block 80. The magnet 70 in the puck 30 can also keep the puck stable to the bottom of the kick stand 320, since the kickstands 320 are generally formed from metal, which would also attract the puck 30 to the kickstand adding to the stability of the invention.

When the motorcycle driver is ready to leave, they can remain seated on the motorcycle 300 and tilt the motorcycle in an upright position, lifting the kickstand 320 off of the puck 30. If needed, they can press the puck 30 against the ground 320 with their foot. The driver can depress release button 270 which can cause the internal biased coil spring 210 to rotate the reel 200 to coil the tether line (cord) 40 into the retriever assembly 20. The motorcycle driver can remain seated in an upright position on the motorcycle 300 and not have to lean over or dismount from the motorcycle 300 to retrieve the puck 30.

Figure 16:
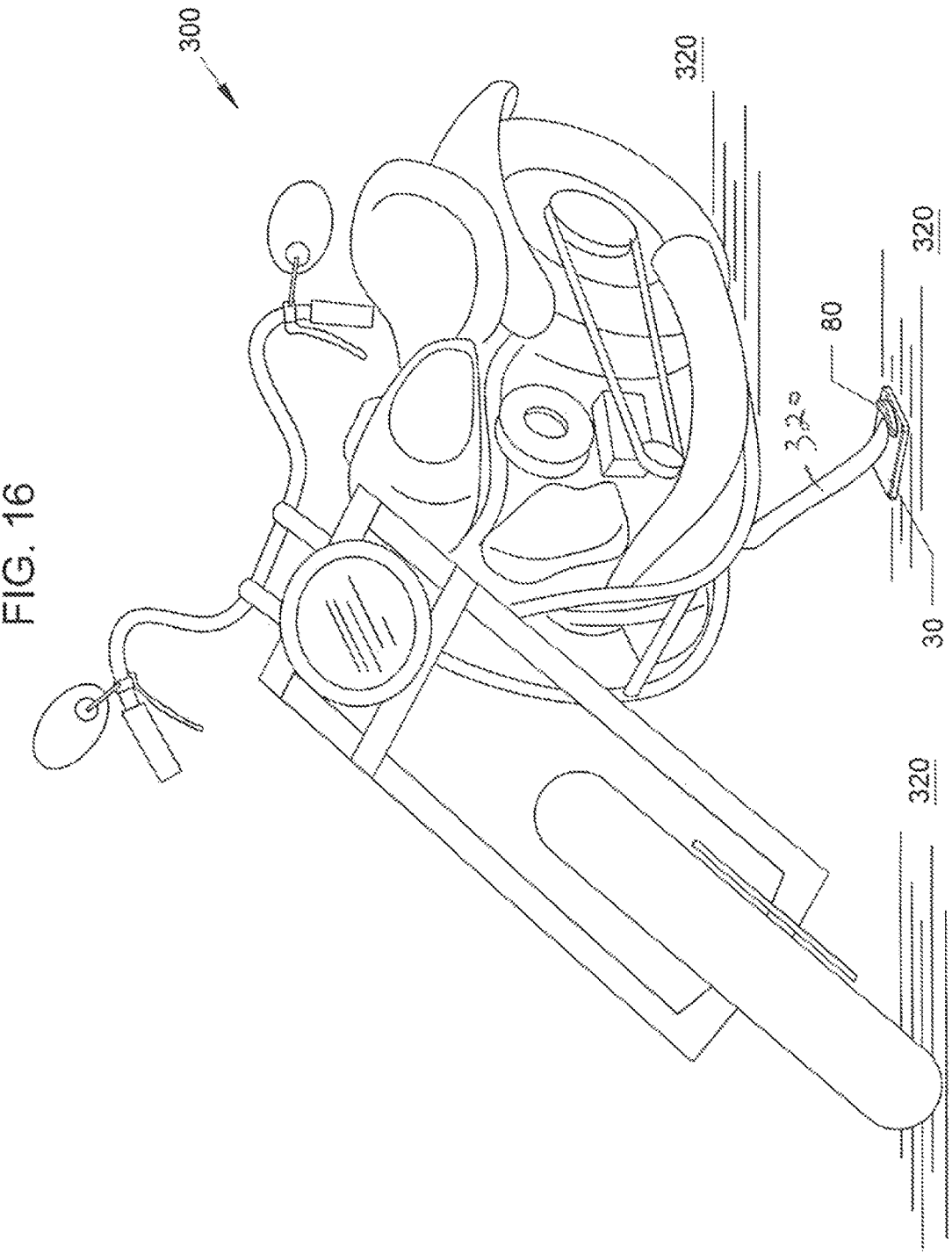
FIG. 16 is another view of FIG. 15 showing that the puck can be used on its own independent of the retriever assembly.

FIG. 16 is another view of FIG. 15 showing that the puck 30 can be used on its' own independent of the retriever assembly 20. Here the puck 30 can be dropped on the ground 320, and the kickstand 320 lowered onto the puck 30 to abut against the raised curved member 80 on the puck.

The kickstand support assembly can be used without the clamps via a magnet to any metal surface.

While the retriever assembly is shown as being attached to a motorcycle handlebar, it can be attached to any other surface, such as any other metal surface by a magnet.

Although using clamps to more permanently mount the retriever assembly on a bike, will assure the rider will always, have the puck handy and accessible.

Although the two-wheeled vehicle described in some of the figures refers to a motorcycle, the invention can be used with other two wheeled vehicles, such as but not limited to bicycles, mopeds, and the like.

Additionally, while the puck is shown attached to the receiver assembly by a magnet and clip, the puck can be used without the receiver assembly, where it is attached to any metal surface by its' magnet.

Although the figures show the puck with a generally rectangular shape, the puck can have a disc or circular shape, or can be of any other geometric shape, and the like.

While the magnets have been shown to be disc shaped (circular), the magnets can have other shapes, such as rectangular shapes, and any other geometric shape and the like. Additionally, while the magnet slot is shown to be circular, the slot can be another shape, such as rectangular or any other geometric shape to match the shape of the magnet.

The housing of the retriever assembly and/or the puck can be formed from different materials, such as a durable material that can include but is not limited to plastic, nylon glass, combinations thereof, and the like. The materials can include UV resistance and/or be salt resistant, and the like.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A retractable kickstand support apparatus for two wheeled vehicles comprising:
   a removable base plate having a magnet, the base plate having a deployed position for being magnetically attachable about an underside of a kickstand of a two-wheeled vehicle;
   a cord having one end attached to the base plate and a second end;
   a mount for releasably attaching the second end of the cord to be adjacent to handlebars of the two-wheeled vehicle; and
   a spring in the mount for automatically retrieving the cord from an extended position to a retracted position, the retracted position of the cord allows the base plate to be attached to the mount, wherein the cord in the extended position allows the base plate to be positioned underneath the kickstand in order to provide stability to the two-wheeled vehicle when the kickstand is lowered.

2. The retractable kickstand support apparatus of claim 1, wherein the mount includes:
   a clamp for attaching the mount to the handlebars of the two-wheeled vehicle.

3. The retractable kickstand support apparatus of claim 2, wherein the mount further includes:
   an elongated slot for allowing the clamp to slide to different lockable positions on the mount.

4. The retractable kickstand support apparatus of claim 1, wherein the mount includes:
   a clip for holding the removable base plate on the mount.

5. The retractable kickstand support apparatus of claim 1, wherein the mount includes:
   a switch for allowing the cord to move from the extended position to the retracted position.

6. The retractable kickstand support apparatus of claim 1, wherein the base plate includes:
   a generally rectangular configuration.

7. The retractable kickstand support apparatus of claim 6, wherein the base plate includes:
   an upper generally flat surface with a raised arc member for forming a stop to rest and edge of the kickstand against.

8. The retractable kickstand support apparatus of claim 6, wherein the base plate includes:
   a lower flat surface.

9. The retractable kickstand support apparatus of claim 1, wherein the base plate includes:
   a lower surface with a molded pattern of indentations for enhancing gripping with a ground surface.

10. The retractable kickstand support apparatus of claim 1, wherein the base plate includes:

a slot for supporting the magnet therein, and the magnet includes a diameter of up to approximately 1 and ½ inches and a thickness of up to approximately 1 inch.

11. The retractable kickstand support apparatus of claim 1, wherein the mount includes:
a separate magnet therein, the separate magnet being used to attract the magnet in the base plate in order to hold the removable base plate to the mount when the cord is in the retracted position.

12. A support system for use with a vehicle kickstand, comprising:
a puck having upper and lower flat surfaces, and with a magnet;
a tether line having one end attached to the puck and a second end;
a mount attached to the second end of the tether line, the mount adapted to be mounted adjacent a rider on a vehicle having a deployed kickstand; and
a spring for retracting the tether from an extended position to a retracted position, wherein the puck in the retracted position has the puck removably attached to the mount, and wherein the puck with the tether line in the extended position is adaptable to be magnetically attached to the deployed kickstand on the vehicle.

13. The support system of claim 12, wherein the mount includes:
a clamp for attaching the mount to a handlebar on the vehicle.

14. The support system of claim 12, wherein the mount further includes:
an elongated slot for allowing the clamp to slide to different lockable positions on the mount.

15. The support system of claim 12, wherein the mount includes:
a clip for holding the puck on the mount.

16. The support system of claim 12, wherein the puck includes:
a generally rectangular configuration.

17. The support system of claim 12, wherein the puck includes:
an upper generally flat surface with a raised arc member for forming a stop to rest an edge of the kickstand against.

18. The support system of claim 12, wherein the puck includes:
a lower surface with a molded pattern of indentations for enhancing gripping with a ground surface.

19. The support system of claim 12, wherein the puck includes:
a slot for supporting the magnet therein, and wherein the magnet includes a diameter of up to approximately 1 and ½ inches and a thickness of up to approximately 1 inch.

20. The support system of claim 12, wherein the mount includes:
a separate magnet therein, the separate magnet being used to attract the magnet in the puck in order to hold the puck to the mount when the tether line is in the retracted position.

* * * * *